United States Patent
Frank et al.

(10) Patent No.: US 9,499,209 B1
(45) Date of Patent: Nov. 22, 2016

(54) SOLAR-ACTIVATED STRUCTURE FOR REVEALING A HIDDEN INDICIA WITHIN A BODY PANEL OF A VEHICLE

(71) Applicant: Ford Global Technologies, LLC, Dearborn, MI (US)

(72) Inventors: Randall R. Frank, Dearborn, MI (US); Greg B. Zinn, Canton, MI (US); Michael J Gardynik, Farmington Hills, MI (US); Christopher Pope, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/799,917

(22) Filed: Jul. 15, 2015

(51) Int. Cl.
| | |
|---|---|
| *B62D 25/12* | (2006.01) |
| *B62D 25/10* | (2006.01) |
| *B60R 13/08* | (2006.01) |
| *B62D 65/06* | (2006.01) |
| *B41M 5/41* | (2006.01) |
| *B60R 13/00* | (2006.01) |
| *B60R 13/07* | (2006.01) |

(52) U.S. Cl.
CPC .............. *B62D 25/12* (2013.01); *B41M 5/41* (2013.01); *B60R 13/00* (2013.01); *B60R 13/005* (2013.01); *B60R 13/07* (2013.01); *B62D 25/105* (2013.01); *B62D 65/06* (2013.01); *B41M 2205/04* (2013.01); *B60R 13/08* (2013.01)

(58) Field of Classification Search
CPC .... B62D 25/10; B62D 25/105; B62D 25/12; B62D 65/06; B60R 13/00; B60R 13/005; B60R 13/07; B60R 13/08
USPC ................. 296/191, 193.11; 180/69.2, 69.22
See application file for complete search history.

(56) References Cited

U.S. PATENT DOCUMENTS

| | | | |
|---|---|---|---|
| 4,917,643 | A | 4/1990 | Hippely et al. |
| 6,450,277 | B1 * | 9/2002 | Kargilis ..................... B44C 5/04 180/69.2 |
| 7,048,971 | B2 | 5/2006 | Arora |
| 7,108,411 | B2 | 9/2006 | Pommeret et al. |
| 7,516,764 | B1 | 4/2009 | Cobb |
| 2004/0262952 | A1 * | 12/2004 | Kempf ..................... B60R 21/34 296/187.04 |
| 2005/0088016 | A1 * | 4/2005 | Ito ........................... B60R 21/34 296/193.11 |
| 2008/0171155 | A1 | 7/2008 | Haupt et al. |
| 2009/0195031 | A1 * | 8/2009 | Ishitobi .................... B60R 21/34 296/193.11 |
| 2010/0066127 | A1 * | 3/2010 | Goda .................. B60R 13/0838 296/193.11 |
| 2015/0353141 | A1 * | 12/2015 | Yoshida ............... B62D 25/105 296/193.11 |

FOREIGN PATENT DOCUMENTS

CN          203460947 U          3/2014

* cited by examiner

*Primary Examiner* — Gregory Blankenship
(74) *Attorney, Agent, or Firm* — Jason C. Rogers; Price Heneveld LLP

(57) ABSTRACT

A solar-activated body panel for a vehicle includes outer and inner panels with an internal cavity defined therebetween. The internal cavity includes first and second portions that correspond to first and second heat gain portions, respectively, on the outer surface, wherein the first heat gain portion retains solar energy at a first heat gain rate and the second heat gain portion retains solar energy at a second heat gain rate, the first heat gain rate being greater than the second heat gain rate. A thermal material is disposed on the outer surface, wherein when solar energy is radiated onto the outer surface, the first heat gain portion absorbs heat at the first heat gain rate and, in turn emits heat to the thermal material to alter the thermal material and define a predetermined indicia on the outer surface and within the thermal material.

14 Claims, 8 Drawing Sheets

US 9,499,209 B1

SOLAR-ACTIVATED STRUCTURE FOR REVEALING A HIDDEN INDICIA WITHIN A BODY PANEL OF A VEHICLE

FIELD OF THE INVENTION

The present invention generally relates to exterior body panels for vehicles, and more specifically, a heat-activated structure for forming a heat-generated image on the exterior surface of a body panel using moisture and precipitation in and around the vehicle.

BACKGROUND OF THE INVENTION

Various automobiles include one or more indicia on the exterior of the vehicle for conveying various information about the make, model, or other characteristic of the particular vehicle. Certain indicia can be painted, etched, or otherwise formed within the shape of the exterior body panel.

SUMMARY OF THE INVENTION

According to one aspect of the present invention, a solar-activated body panel for a vehicle includes an outer panel and an inner panel with an internal cavity defined therebetween. The internal cavity includes first and second portions that correspond to first and second heat gain portions, respectively, on the outer surface, wherein the first heat gain portion retains solar energy at a first heat gain rate and the second heat gain portion retains solar energy at a second heat gain rate, the first heat gain rate being greater than the second heat gain rate. A thermal material is disposed on the outer surface of the outer panel, wherein when solar energy is radiated onto the outer surface, the first heat gain portion absorbs heat at the first heat gain rate and, in turn, emits heat to the thermal material to alter the thermal material and define a predetermined indicia on the outer surface and within the thermal material.

According to another aspect of the present invention, a vehicle body panel includes an exterior panel defining an internal cavity, wherein the internal cavity includes first and second portions that absorb solar energy at first and second rates, respectively, the second rate being faster than the first rate. A thermal material is disposed on an outer surface of the exterior panel, wherein the thermal material is heated by the first portion to reveal a predetermined indicia within the thermal material.

According to another aspect of the present invention, a method for passively forming a predetermined indicia on the surface of a vehicle includes providing an exterior panel for a vehicle, the exterior panel defining an internal cavity, wherein the internal cavity includes first and second portions that absorb solar energy at first and second rates, respectively, the second rate being faster than the first rate. The first and second portions are positioned in a pattern corresponding to a predetermined image, the first portion having a shape substantially similar to that of the predetermined image. The predetermined image is generated by placing a vehicle having the exterior panel in a position such that precipitation and solar energy are received by the outer surface of the exterior panel, wherein after the outer surface of the exterior panel receives the precipitation, solar energy received by the outer surface proximate the first portion causes a rise in surface temperature within the outer surface proximate the first portion at a rate faster than the outer surface of the exterior panel proximate the second portion. At least a portion of the precipitation proximate the first portion heats and undergoes a change of state before the precipitation proximate the second portion, and wherein the predetermined image is defined on the outer surface of the exterior panel and within the precipitation disposed on the outer surface.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
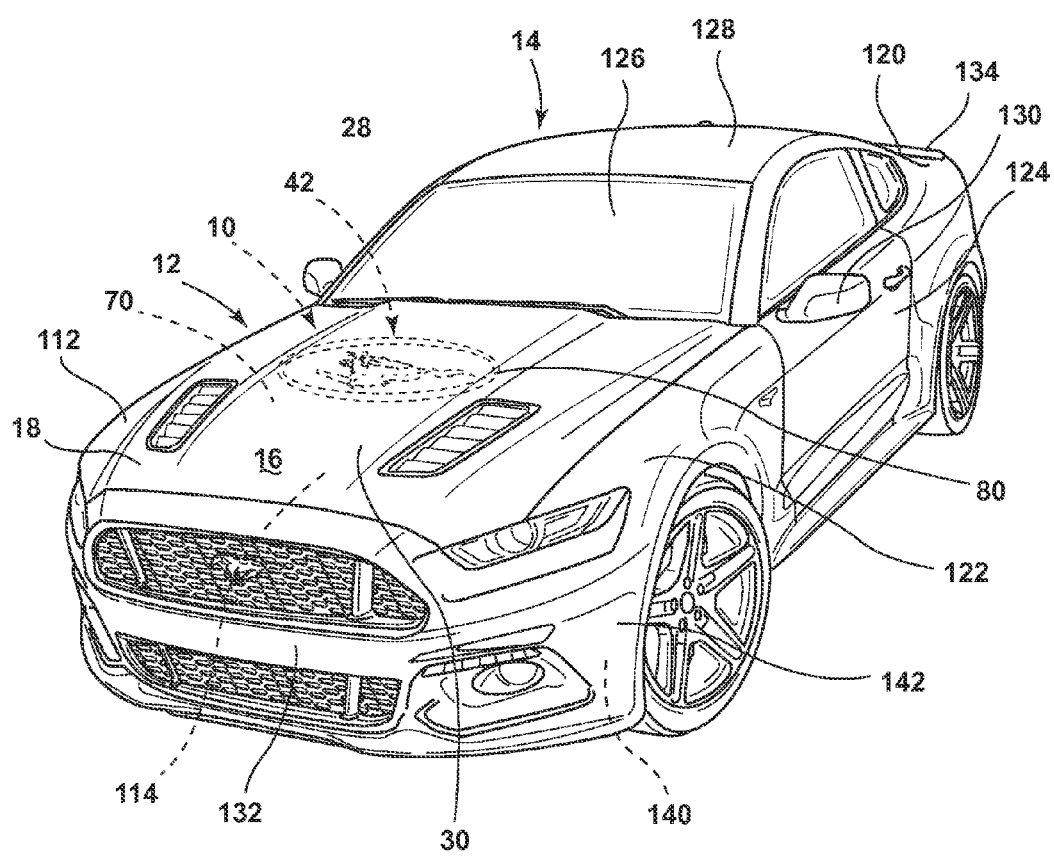
FIG. 1 is a top perspective view of a vehicle incorporating a solar-activated structure within a body panel of the vehicle.
Figure 2:
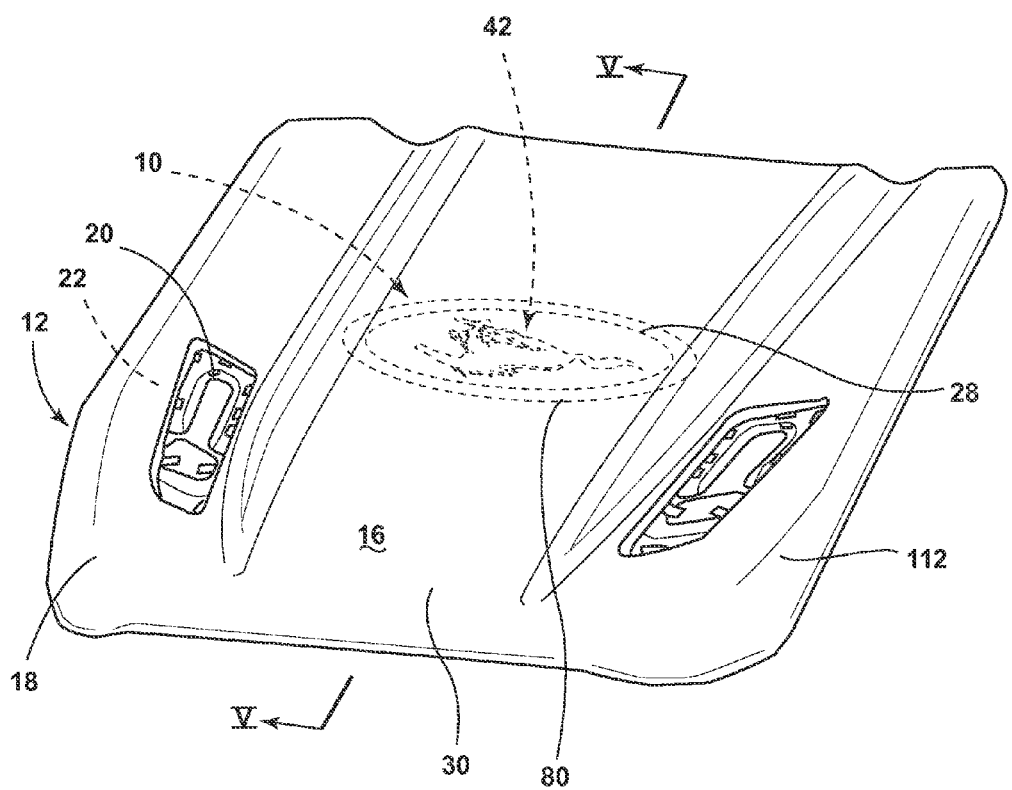
FIG. 2 is a top perspective view of a body panel for the vehicle of FIG. 1.
Figure 3:
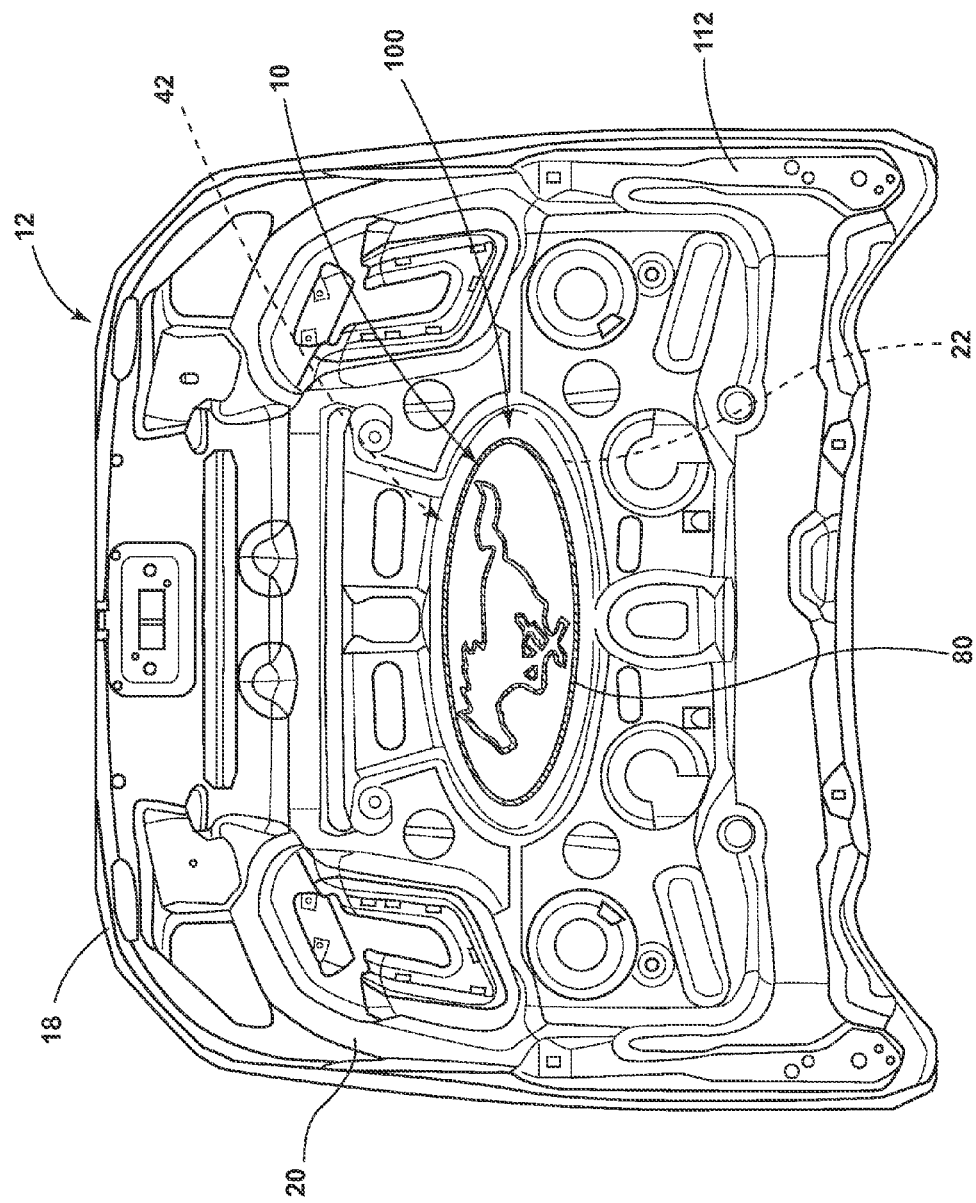
FIG. 3 is a bottom plan view of the body panel of FIG. 2, with the insulation layer of the body panel removed.
Figure 4:
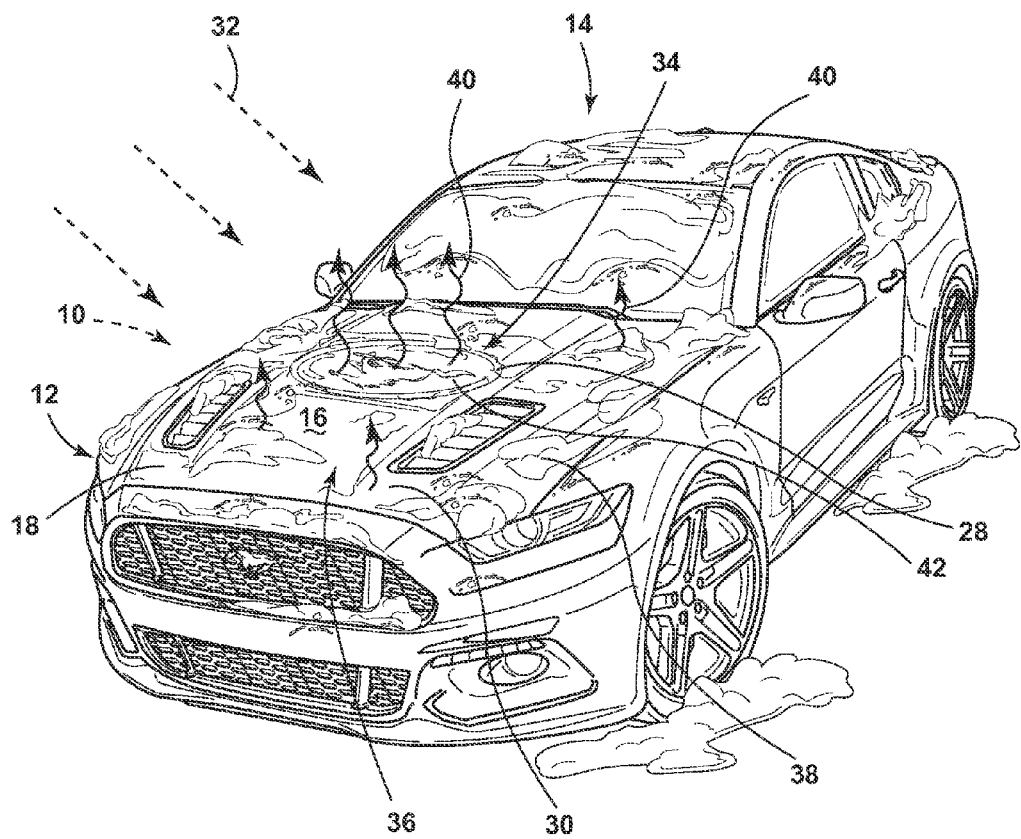
FIG. 4 is a cross-sectional view of the body panel of FIG. 2 taken along line IV-IV and illustrating the solar-activated structure for heating an outer surface of the body panel.
Figure 5:
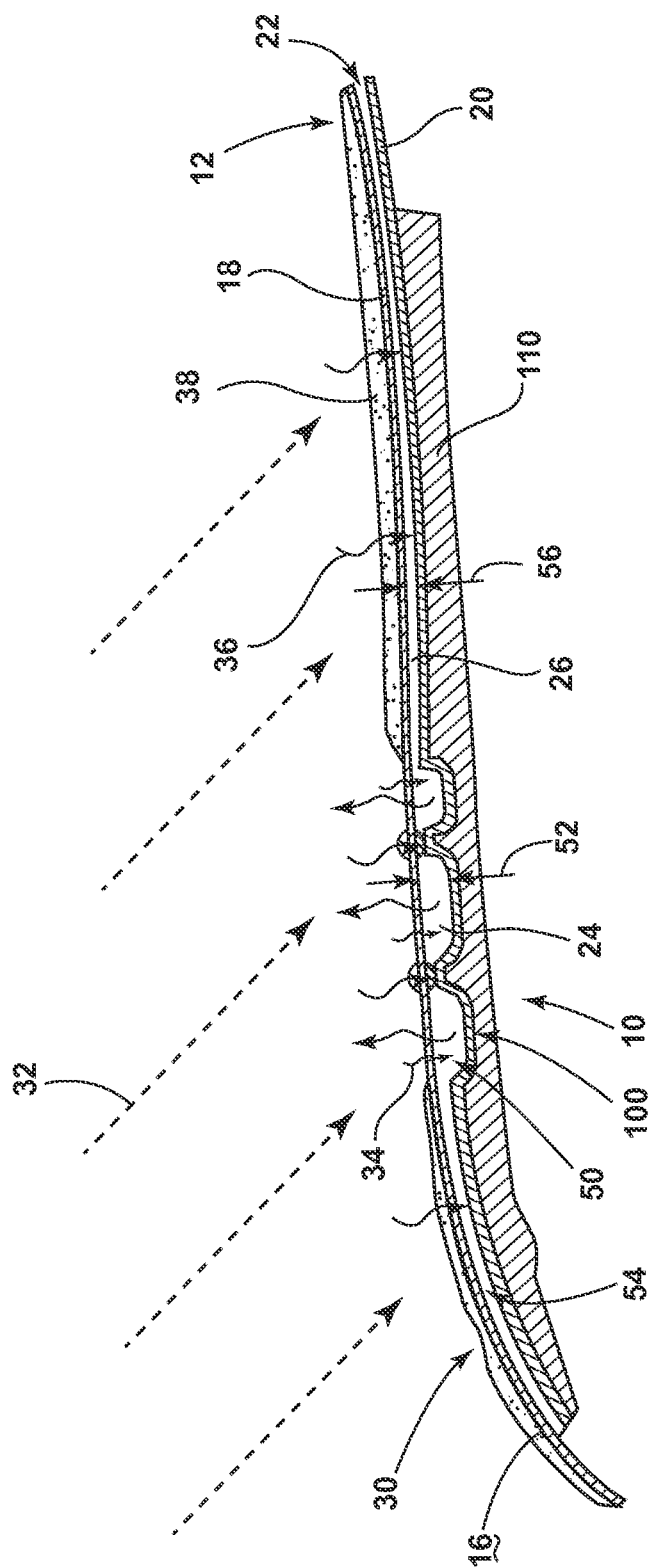
FIG. 5 is a top perspective view of the vehicle of FIG. 1 illustrating the effects of the solar-activated structure heating the outer surface of the body panel.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As shown in FIGS. 1-5, reference numeral 10 generally refers to a solar-activated structure disposed within a body panel 12 for a vehicle 14, where the solar-activated structure 10 is in thermal communication with an outer surface 16 of the body panel 12, according to various embodiments. The solar-activated structure 10 for the body panel 12 of the vehicle 14 can include an outer panel 18 and an inner panel 20 with an internal cavity 22 defined therebetween. The internal cavity 22 can include first and second portions 24, 26 that correspond to first and second heat gain portions 28, 30, respectively, on the outer surface 16 of the body panel 12. The first heat gain portion 28 is configured to retain solar energy 32 at a first heat gain rate 34 and the second heat gain portion 30 is configured to retain solar energy 32 at a second heat gain rate 36, where the first heat gain rate 34 is greater than the second heat gain rate 36. Accordingly, where solar energy 32 engages the outer surface 16 of the body panel 12, the first heat gain portion 28, having the higher and first heat gain rate 34, tends to increase in temperature faster than the second heat gain portion 30 of the outer surface 16 of the body panel 12. A thermal material 38 can be disposed in the outer surface 16 of the outer panel 18. When solar energy 32 is radiated onto the outer surface 16, the first heat gain portion 28 absorbs the solar energy 32, such as heat 40, at the first heat gain rate 34 and, in turn, emits heat 40 to the thermal material 38 in order to alter the thermal material 38 and define a predetermined indicia 42 on the outer surface 16 and within the thermal material 38 disposed on the outer surface 16 of the outer panel 18. It is contemplated that the thermal material 38 can be precipitation in the form of at least one of snow, ice, frost, dew and rainwater. It is also contemplated that the thermal material 38 can be other forms of liquid, such as water, that may become disposed on the outer surface 16 of the body panel 12, such as during car washes, splashed surface water, and other potential liquid sources.

Referring again to FIGS. 1-5, the heat-activated structure of the body panel 12 can be configured such that the first portion 24 of the internal cavity 22 includes a space 50 having a first thickness 52. Similarly, the second portion 26 of the internal cavity 22 can include a gap 54 having a second thickness 56, where the second thickness 56 is less than the first thickness 52. According to this configuration, portions of the body panel 12 near the second portion 26 have greater amounts of material near the outer surface 16 of the body panel 12 due to the closer set configuration of the gap 54 between the outer panel 18 and the inner panel 20, within the areas proximate the second portion 26. When solar energy 32 hits portions of the outer surface 16 of the body panel 12 within the second heat gain portion 30, heat 40 generated within the outer panel 18 is capable of being absorbed by the inner panel 20 due to the transfer of heat 40 across the gap 54 between the outer panel 18 and the inner panel 20 in the areas defining the second heat gain portion 30 and the second portion 26 of the internal cavity 22. Conversely, when solar energy 32 is radiated onto the outer surface 16 within areas defined by the first heat gain portion 28 and the first portion 24 of the internal cavity 22, the outer panel 18 proximate the first portion 24 increases in temperature. However, because of the space 50 between the outer and inner panels 18, 20 of the body panel 12, which has a greater thickness than the gap 54, less heat 40 is able to be transferred from the outer panel 18, across the space 50, and into the inner panel 20. The result is that areas of the outer surface 16 of the body panel 12 within the first heat gain portion 28 retain more heat 40 and increase in temperature faster than areas within the second heat gain portion 30. Accordingly, thermal material 38 disposed on the outer surface 16 of the body panel 12 receives greater amounts of heat 40 from areas within the first heat gain portion 28 and are thereby affected by the heat 40 in a lesser amount of time. In this manner, precipitation on the first heat gain portion 28 of the outer surface 16 are heated faster and are melted/evaporated to change the state of matter of the precipitation disposed on the outer surface 16 of the body panel 12 within the first heat gain portion 28, before thermal material 38 on the second heat gain portion 30 can be heated to a sufficient degree to change the state of matter in similar fashion.

By way of example, and not limitation, where a vehicle 14 is parked in a substantially unenclosed space 50 where it can receive both precipitation and solar energy 32, precipitation, such as in the form of dew, may collect on the outer surface 16 of the body panel 12. As solar energy 32 is emitted on the dew-covered outer surface 16 of the body panel 12, the solar energy 32 heats areas within the predetermined indicia 42 defined within the first heat gain portion 28 of the outer surface 16 of the body panel 12, which can correspond to the first portion 24 of the internal cavity 22 defined within the body panel 12. The faster heating of the first heat gain portion 28 within the predetermined indicia 42 causes an evaporation of the dew within the predetermined indicia 42. Conversely, areas outside of the predetermined indicia 42, corresponding to the second heat gain portion 30 of the outer surface 16 of the body panel 12, take a longer time to evaporate, such that, for a certain amount of time, the absence of dew within the area defined by the predetermined indicia 42, within the dew, in combination with the presence of dew on the outer surface 16 of the body panel 12 outside of the predetermined indicia 42, reveals the shape of the predetermined indicia 42 to viewers around the vehicle 14. While the above example illustrates the use of solar energy 32 in revealing the predetermined indicia 42 within dew disposed upon the outer surface 16 of the body panel 12, a similar effect can be realized where different forms of precipitation are disposed upon the outer surface 16 of the body panel 12, such as snow, ice, frost, rainwater, and other forms of precipitation. Additionally, the effects of the solar-activated structure 10 can be realized when non-precipitation fluids are disposed on the outer surface 16 of the body panel 12, where the non-precipitation fluids can be effected through the presence of solar energy 32 radiating upon the outer surface 16 of the body panel 12.

Referring again to FIGS. 1-5, because the solar-activated structure 10 is operated through the use of solar energy 32 radiating upon the outer surface 16 of the body panel 12, the operation of the solar-activated structure 10 can be performed even when the engine 70 of the vehicle 14 is deactivated. Additionally, the solar-activated structure 10 can be operated when all of the systems of the vehicle 14 are deactivated, such as when the vehicle 14 is parked on a factory lot, a dealership lot, being transported on a trailer or position. The solar-activated structure 10 requires only the presence of solar energy 32 and some thermal material 38, such as fluid in a liquid or solid state, disposed on the outer other vehicle transport, sitting in a driveway, or in any other setting where the vehicle 14 may be in a deactivated surface 16 of the body panel 12.

Referring again to FIGS. 1-5, it is contemplated that solar energy 32 can be used to activate the solar-activated structure 10. According to the various embodiments, it is also contemplated that artificial lighting that is able to emit a predetermined amount of light energy capable of heating the outer surface 16 of the body panel 12 of the vehicle 14 can also be used to activate the solar-activated structure 10. Accordingly, it is contemplated that such artificial lighting can be used during an overcast day where insufficient amounts of solar energy 32 are being radiated upon the outer surface 16 of the vehicle 14 to activate the solar-activated structure 10. Such artificial lighting can also supplement solar energy 32 during times of the year when the amount of solar energy 32 reaching the ground is diminished, such as during winter months.

Referring again to FIGS. 1-5, according to the various embodiments, the use of solar energy 32, or heat-generating artificial light can be used to passively reveal the predetermined indicia 42, or a predetermined image upon the outer surface 16 of a body panel 12 of a vehicle 14, without the vehicle 14 being activated in any manner. As discussed above, this configuration can be implemented where the vehicle 14 is placed in a position where it can receive precipitation as well as solar energy 32 for activating the solar-activated structure 10 to act upon the precipitation to provide differential heating that acts upon the precipitation to melt/evaporate the precipitation at different rates over time to temporarily reveal the predetermined indicia 42. According to the various embodiments, it is contemplated that the first portion 24 of the internal cavity 22 can be disposed within a boundary 80 defined by the predetermined indicia 42. In such an embodiment, the thermal material 38 can be heated and substantially removed by heat 40 that is emitted from the outer surface 16 of the body panel 12 proximate the first heat gain portion 28 and the first portion 24 of the internal cavity 22.

Figure 6:
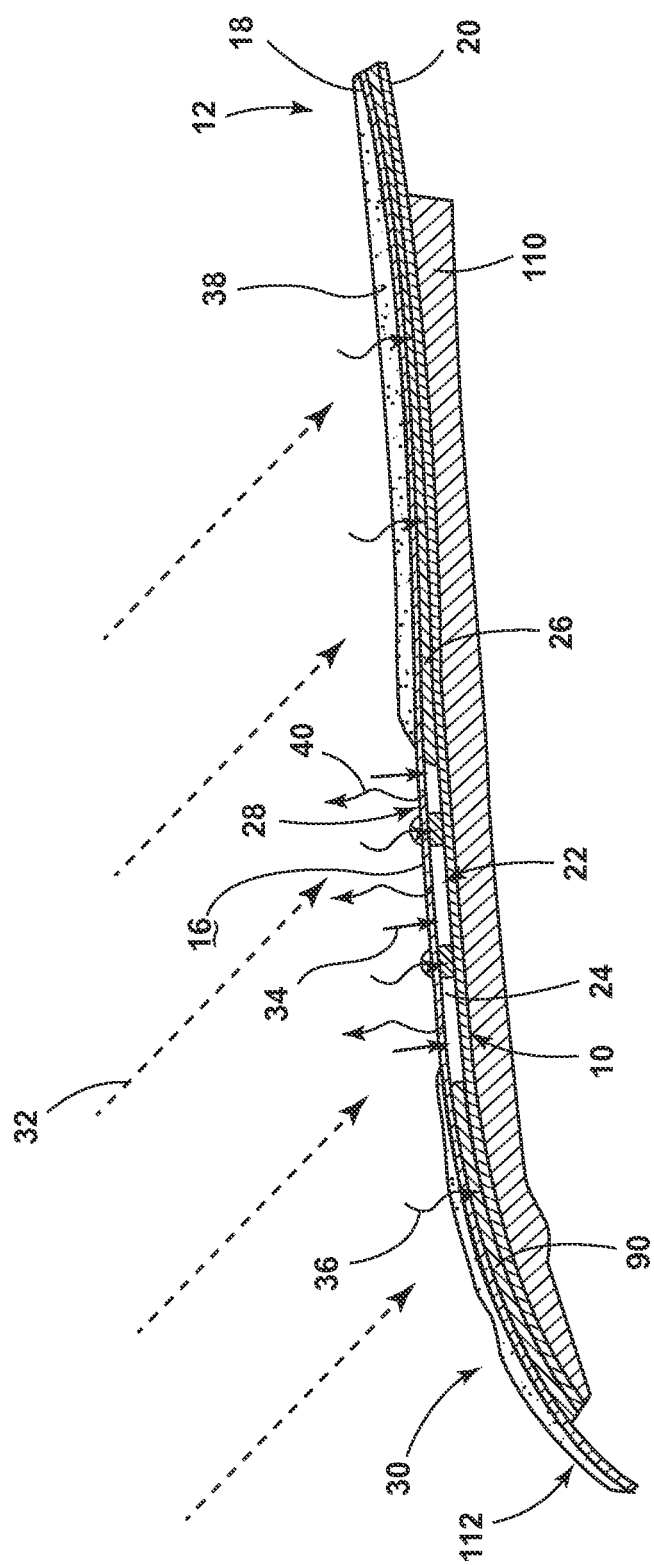
FIG. 6 is a cross-sectional view of an alternate embodiment of the body panel of FIG. 4 illustrating a solar-activated structure incorporating one or more heat-absorbing materials.

Referring now to FIG. 6, it is contemplated that the body panel 12 of a vehicle 14, such as an exterior panel, can define the internal cavity 22 therein. It is contemplated that the internal cavity 22 can include first and second portions 24, 26 that absorb solar energy 32 at first and second rates, respectively, where the second rate of heat absorption is faster than the first rate of heat absorption. In such an embodiment, the thermal material 38 disposed on the outer surface 16 of the body panel 12 can be heated by solar energy 32 in conjunction with a space 50 defined within the first portion 24 to reveal the predetermined indicia 42 within the thermal material 38. Because the exterior panel, directed to the space 50 within the first portion 24, absorbs heat 40 at a slower rate, the outer surface 16 of the body panel 12 increases in temperature faster as less of the heat 40 can be absorbed through the space 50 and within the body panel 12. Conversely, the second portion 26 of the body panel 12 absorbs heat 40 faster into portions of the body panel 12, such that the outer surface 16 of the body panel 12 proximate the second portion 26 heats more slowly.

According to various embodiments, as exemplified in FIG. 6, it is contemplated that the second portion 26 can include a heat-absorbing material 90, such as a heat sink, in order to provide greater heat absorption capability within the second portion 26 of the body panel 12. The heat sink disposed therein allows more heat 40 to be absorbed within the second portion 26 such that the outer surface 16 of the body panel 12 within the second portion 26 heats slower, due to the presence of the heat-absorbing material 90. It is also contemplated that where the heat-absorbing material 90 is implemented within the body panel 12 of the vehicle 14, the internal cavity 22 defined between the outer panel 18 and the inner panel 20 can have a substantially consistent thickness throughout the body panel 12. In such an embodiment, the presence of the heat-absorbing material 90 within the internal cavity 22 provides the varying degree of heat absorption within the internal cavity 22, as well as the varying degree of heating within the outer surface 16 of the body panel 12 as solar energy 32 is radiated upon the outer surface 16 of the body panel 12. It is contemplated that the heat-absorbing material 90 can be made of a thermally conductive material that is able to absorb heat 40 from the outer surface 16 of the body panel 12. Such thermally conductive material that can form a heat sink can include, but is not limited to, aluminum, brass, copper, alloys thereof, non-metallic thermal conductors, combinations thereof, and other similar thermally conductive materials.

Figure 7:
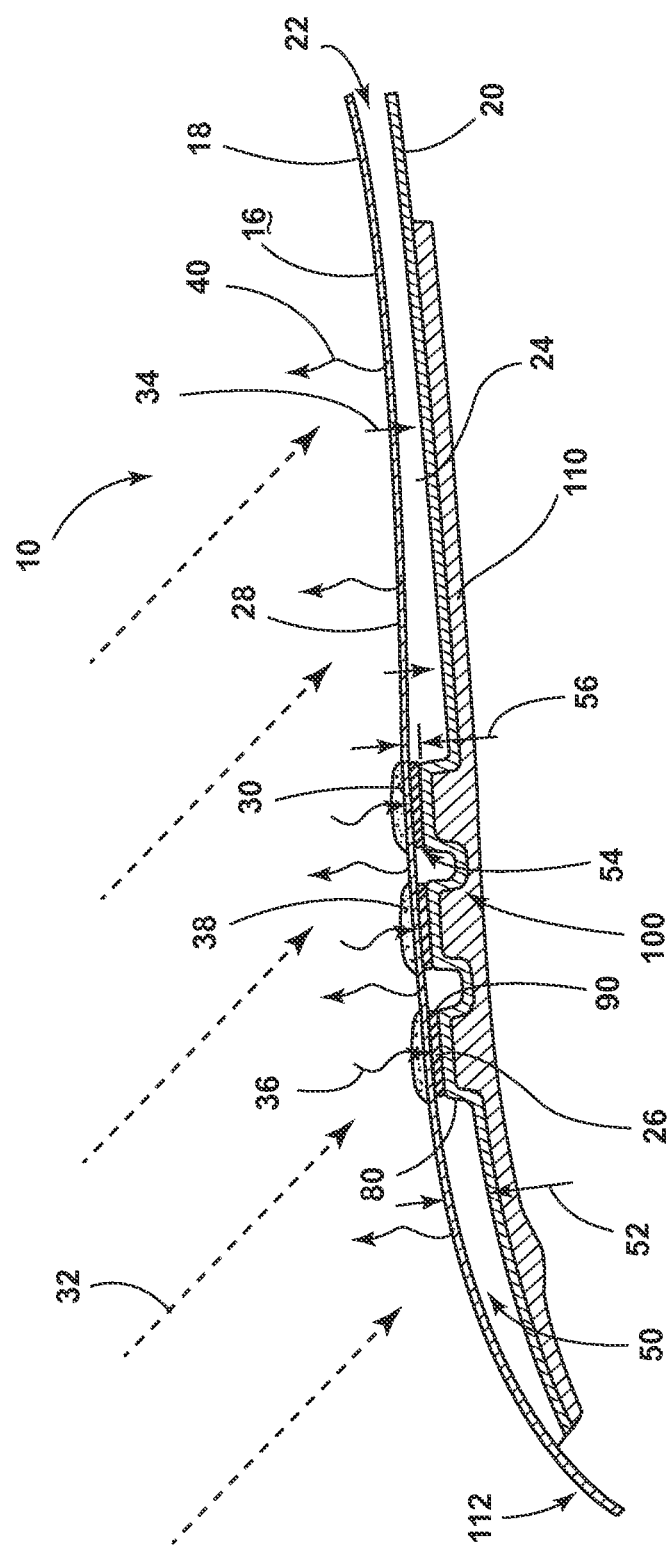
FIG. 7 is a cross-sectional view of an alternate embodiment of the body panel of FIG. 4 illustrating the solar-activated structure.

Referring now to FIG. 7, according to various embodiments, it is contemplated that the predetermined indicia 42 can be defined by the absence of a thermal material 38 upon the outer surface 16 of the body panel 12 after the solar-activated structure 10 has acted upon the thermal material 38. According to various alternate embodiments, it is contemplated that the predetermined indicia 42 can be defined by the presence of the thermal material 38 where the heat-activated structure causes accelerated heating of portions of the outer surface 16 of the body panel 12 outside the boundary 80 of the predetermined indicia 42. In such an embodiment, a combination of gaps 54 and spaces 50, as well as the inclusion of various heat sinks, can be included to provide accelerated heating to portions of the outer surface 16 of the body panel 12 outside of the predetermined indicia 42 to reveal the predetermined indicia 42 through the presence of thermal material 38, such as precipitation or other liquids, remaining upon the outer surface 16 of the body panel 12. It is contemplated that this remaining thermal material 38 on the outer surface 16 serves to define the predetermined indicia 42, either directly, or indirectly, depending on the configuration of the solar-activated structure 10.

According to the various embodiments, as illustrated in FIGS. 1-5 and 7, where the internal cavity 22 includes a series of gaps 54 and spaces 50 to at least partially define the solar-activated structure 10, the internal cavity 22 can be defined between the outer panel 18 and the inner panel 20 having a series of contours 100 or undulations. In such an embodiment, an undulating or varied shape of the inner panel 20 defines the contours 100 that, when attached to the outer panel 18, defines a plurality of cavity thicknesses as measured between the outer panel 18 and the contoured inner panel 20. It is further contemplated that the cavity thicknesses within the first portion 24 of the internal cavity 22 can define an indicial thickness, corresponding to one of the gaps 54 or spaces 50 of the internal cavity 22. Conversely, the cavity thicknesses within the second portion 26 of the internal cavity 22 can define a hood thickness, wherein the hood thickness corresponds to the other of the gaps 54 or spaces 50. It is contemplated that such an embodiment can be used to define the gaps 54 and spaces 50 of the body panel 12 that at least partially define the solar-activated structure 10. It is contemplated that the inner panel 20 can include apertures proximate the first portion 24.

Referring again to FIGS. 1-7, the body panel 12 can include an insulation layer 110 proximate on an inner portion of the body panel 12. This is particularly true where the body panel 12 is a hood 112 that covers an engine compartment 114 of the vehicle 14. In such an embodiment, the insulation layer 110 tends to prevent substantial amounts of heat 40 and sound from the engine 70 from radiating through the hood 112. It is contemplated that the solar-activated structure 10 can be disposed between the insulation layer 110 and the outer panel 18 of the body panel 12. In this manner, the insulation layer 110 may not affect the passive operation of the solar-activated structure 10, as described herein.

According to various embodiments, it is contemplated that heat 40 from below the hood 112, such as from the engine compartment 114, can be allowed to radiate upward. In this manner, the solar-activated structure 10, in certain embodiments, can be partially activated by heat 40 from the engine compartment 114 after the vehicle 14 has been activated and during operation of the vehicle 14. Accordingly, in such embodiments, the predetermined indicia 42 can be at least partially formed by both solar energy 32 and by heat 40 from below the hood 112.

Referring again to FIGS. 1-7, it is contemplated that the solar-activated structure 10 can be incorporated within various body panels 12 of the vehicle 14. Such body panels 12 can include, but are not limited to, the hood 112, trunk lid 120, quarter panels 122, doors 124, windows 126, roof 128, mirrors 130, bumpers 132, spoilers 134, fins and other similar body panels 12 of the vehicle 14.

Referring again to FIG. 1, in addition to the use of precipitation and other liquids as the thermal material 38, it is also contemplated that the thermal material 38 can include a thermochromatic material 140 disposed within the body panel 12 or within a layer of paint 142 on the body panel 12. Such a thermochromatic material 140 can be configured to change color depending on the temperature of the outer surface 16 of the outer panel 18 and, in turn, the temperature of the thermochromatic material 140. Such a thermochromatic material 140 can be used in conjunction with the various solar-activated structures 10 disclosed herein to change the color of the first and second heat gain portions 28, 30 of the outer surface 16 of the body panel 12 to reveal, in color variations, the predetermined indicia 42. In this manner, the thermochromatic material 140 can be placed in communication with the solar-activated structure 10 to reveal the predetermined indicia 42 whether precipitation is present or not. Accordingly, the color-changing functionality of the thermochromatic material 140 that can be activated by the solar-activated structure 10 can stand alone to reveal the predetermined indicia 42, or can supplement the exposure of the predetermined image that may be revealed through both precipitation and the thermochromatic material 140.

Figure 8:
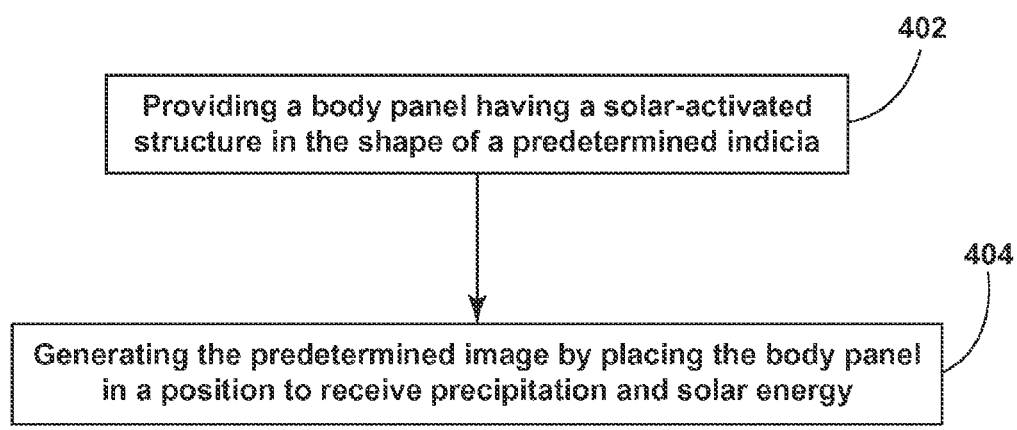
FIG. 8 is a schematic flow diagram illustrating a method for passively forming a predetermined indicia on the outer surface of a vehicle.

Referring now to FIG. 8, having defined the solar-activated structure 10 of the various embodiments, a method 400 is disclosed for passively forming a predetermined indicia 42 on the outer surface 16 of a vehicle 14. The method 400 can include a step 402 of providing an exterior panel for a vehicle 14. The exterior panel can define an internal cavity 22 that includes first and second portions 24, 26 that absorb solar energy 32 at first and second rates, respectively. It is contemplated that the second rate of heat absorption can be faster than the first rate of heat absorption, although the opposite can be true in the various embodiments. The first and second portions 24, 26 are positioned within the internal cavity 22 to define a pattern that corresponds to a predetermined image that can be defined within the outer surface 16 of the outer panel 18. In such an embodiment, the first portion 24 of the internal cavity 22 can be configured to have a shape that is substantially similar to that of a predetermined image.

According to the various embodiments, it is contemplated that the first portion 24 of the internal cavity 22 can also define an area outside of the predetermined indicia 42 such that the predetermined indicia 42 on the outer surface 16 of the body panel 12 is defined by the presence of a thermal material 38, such as precipitation, defined on the outer surface 16.

It is also contemplated that the internal cavity 22 can also include various heat sinks that can add to the absorption of solar energy 32 within one of the first and second portions 24, 26 of the internal cavity 22, depending upon the manner in which the predetermined indicia 42 is revealed on the outer surface 16 of the body panel 12.

Referring again to FIG. 8, another step 404 of the method 400 includes generating the predetermined image by placing the vehicle 14 having the outer panel 18 in a position such that precipitation and solar energy 32 are received by the outer surface 16 of the outer panel 18. In such an embodiment, after the outer surface 16 of the outer panel 18 receives the precipitation disposed on the outer surface 16, solar energy 32 received by the outer surface 16 proximate the first portion 24 of the internal cavity 22 causes a rise in surface temperature within the outer surface 16 proximate the first portion 24. This rise in surface temperature is at a rate faster than the outer surface 16 of the outer panel 18 proximate the second portion 26. In this manner, at least a portion of the precipitation proximate the first portion 24 heats and undergoes a change of state before the precipitation proximate the second portion 26 undergoes a substantially similar change of state. By way of example, and not limitation, such a change of state can be solid water melting into liquid water and/or liquid water evaporating into water vapor. Accordingly, the predetermined indicia 42, such as an image, can be defined on the outer surface 16 of the outer panel 18 and within the precipitation disposed on the outer surface 16.

According to the various embodiments, it is contemplated that the method 400 can be accomplished without the activation of any of the electrical, mechanical, or other systems of the vehicle 14. The solar-activated structure 10 can be activated through the presence of solar energy 32 emanating on the outer surface 16 of the body panel 12. In this manner, the solar energy 32 can be absorbed at various rates within the first and second portions 24, 26 of the internal cavity 22, and, in turn, the outer surface 16 of the body panel 12 increases in temperature at rates substantially proportional to the respective first and second portions 24, 26 of the internal cavity 22. In this manner, the presence of solar energy 32 being emitted on the outer surface 16 causes the predetermined indicia 42 to be passively revealed without activation of the vehicle 14 in any respect.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A solar-activated body panel for a vehicle, the solar-activated body panel comprising:
    an outer panel and an inner panel with an internal cavity defined therebetween, wherein the internal cavity has a substantially consistent thickness and includes first and second portions that correspond to first and second heat gain portions, respectively, on an outer surface, wherein the first heat gain portion retains solar energy at a first heat gain rate and the second heat gain portion retains solar energy at a second heat gain rate, the first heat gain rate being greater than the second heat gain rate, wherein the second portion includes a heat sink; and
    a thermal material disposed on the outer surface of the outer panel, wherein when solar energy is radiated onto the outer surface, the first heat gain portion absorbs heat at the first heat gain rate and, in turn, emits heat to the thermal material to alter the thermal material and define a predetermined indicia on the outer surface and within the thermal material.

2. The solar-activated body panel of claim 1, wherein the thermal material is precipitation in a form of at least one of snow, ice, frost, dew and rainwater.

3. The solar-activated body panel of claim 1, wherein the first portion includes a space having a first thickness and the second portion includes a gap having a second thickness that is less than the first thickness.

4. The solar-activated body panel of claim 1, wherein the predetermined indicia is visible within the thermal material disposed on the body panel of a vehicle when an engine of the vehicle is deactivated.

5. The solar-activated body panel of claim 1, wherein the first portion is disposed within a boundary of the predetermined indicia, wherein the thermal material is heated and removed by heat emitted from proximate the first portion of the internal cavity, and wherein heat generated during operation of the vehicle partially heats the thermal material.

6. A vehicle body panel comprising:
   thermal material disposed on an outer surface of an outer panel defining a cavity having a substantially consistent thickness; and
   thermally conductive material disposed within the cavity, the cavity including first and second portions that absorb solar energy at a first rate and a faster second rate, respectively,
   wherein the thermal material is heated by the first portion to reveal a predetermined indicia within the thermal material.

7. The vehicle body panel of claim 6, wherein the thermal material is precipitation in a form of at least one of snow, ice, frost, dew and rainwater.

8. The vehicle body panel of claim 6, wherein the thermally conductive material is disposed within the second portion of the internal cavity.

9. The vehicle body panel of claim 6, wherein the predetermined indicia is visible within the thermal material disposed on the outer panel of a vehicle when an engine of the vehicle is deactivated.

10. The vehicle body panel of claim 6, wherein the internal cavity is defined between the outer panel and a contoured inner panel that are attached together, and wherein the internal cavity defines a plurality of cavity thicknesses measured between the outer panel and the contoured inner panel, wherein the cavity thickness within the first portion is an indicial thickness and the cavity thickness within the second portion is a hood thickness, wherein the hood thickness is thinner than the indicial thickness.

11. The vehicle body panel of claim 6, wherein the first portion is disposed outside of a boundary of the predetermined indicia, wherein the thermal material is heated and removed by heat emitted from the first portion of the internal cavity such that the remaining thermal material on the outer surface defines the predetermined indicia.

12. A method for passively forming a predetermined indicia on a surface of a vehicle comprising steps of:
   providing an outer panel for a vehicle, the outer panel defining an internal cavity having a substantially consistent thickness and being at least partially filled with a thermally conductive material, wherein the internal cavity includes first and second portions that absorb solar energy at first and second rates, respectively, the second rate being faster than the first rate, wherein the first and second portions are positioned in a pattern corresponding to a predetermined image, the first portion having a shape substantially similar to that of the predetermined image; and
   generating the predetermined image by placing a vehicle having the outer panel in a position such that precipitation and solar energy are received by the outer surface of the outer panel, wherein after the outer surface of the outer panel receives the precipitation, the solar energy received by the outer surface proximate the first portion causes a rise in surface temperature within the outer surface proximate the first portion at a rate faster than the outer surface of the outer panel proximate the second portion, wherein at least a portion of the precipitation proximate the first portion heats and undergoes a change of state before the precipitation proximate the second portion, and wherein the predetermined image is defined on the outer surface of the outer panel and within the precipitation disposed on the outer surface.

13. The method of claim 12, wherein the change of state of the precipitation is at least one of solid water melting into liquid water and liquid water evaporating into water vapor.

14. The method of claim 12, wherein the step of generating the predetermined image is accomplished without activating any portion of the vehicle.

* * * * *